United States Patent
Danbratt et al.

(10) Patent No.: US 11,808,201 B2
(45) Date of Patent: Nov. 7, 2023

(54) SYSTEM, A METHOD OF CONTROLLING A SYSTEM, AND A VEHICLE COMPRISING A SYSTEM

(71) Applicant: VOLVO TRUCK CORPORATION, Gothenburg (SE)

(72) Inventors: Johan Danbratt, Gothenburg (SE); Alexander Ölén, Alingsås (SE); Ronny Lindgren, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/056,894

(22) Filed: Nov. 18, 2022

(65) Prior Publication Data
US 2023/0160333 A1    May 25, 2023

(30) Foreign Application Priority Data
Nov. 22, 2021   (EP) ..................... 21209540

(51) Int. Cl.
*F02B 11/02*    (2006.01)
*F02M 25/00*    (2006.01)
*F02M 43/04*    (2006.01)

(52) U.S. Cl.
CPC ............. *F02B 11/02* (2013.01); *F02M 25/00* (2013.01); *F02M 43/04* (2013.01)

(58) Field of Classification Search
CPC .......... F02M 25/00; F02M 43/04; F02B 11/02
USPC ............. 123/1 A, 297, 298, 299, 300, 198 A
See application file for complete search history.

(56) References Cited

U.S. PATENT DOCUMENTS

| | | |
|---|---|---|
| 6,463,907 B1 | 10/2002 | Hiltner |
| 10,202,929 B1 | 2/2019 | Dec et al. |
| 2008/0127933 A1 | 6/2008 | Blumberg et al. |
| 2009/0150050 A1 | 6/2009 | Mashida et al. |

(Continued)

FOREIGN PATENT DOCUMENTS

| | | |
|---|---|---|
| EP | 2034162 A1 | 3/2009 |
| JP | H0968061 A | 3/1997 |

(Continued)

OTHER PUBLICATIONS

Extended European Search Report in corresponding European Application No. 21209540.0 dated May 17, 2022 (7 pages).

(Continued)

*Primary Examiner* — Hai H Huynh
(74) *Attorney, Agent, or Firm* — Venable LLP; Jeffri A. Kaminski

(57) ABSTRACT

An internal combustion engine system for a vehicle includes an internal combustion engine, ICE, operable on a low cetane fuel and having a cylinder at least partly defining a combustion chamber and an ignition source for the low cetane fuel; a fuel injector for injecting the low cetane fuel into the combustion chamber; an ignition improver device in fluid communication with the fuel injector and further configured to supply an ignition improver fluid to the low cetane fuel; a control unit configured to selectively operate the ICE in a spark ignition, SI, mode and a compression ignition, CI, mode. The control unit determines an ICE operating condition and controls the ignition improver device to supply a given amount of ignition improver fluid to the low cetane fuel on the basis of said determined ICE operating condition.

17 Claims, 3 Drawing Sheets

(56) References Cited

U.S. PATENT DOCUMENTS

2009/0216423 A1 8/2009 Forti et al.
2014/0316677 A1 10/2014 Stockner et al.

FOREIGN PATENT DOCUMENTS

| JP | 3799920 | * | 7/2006 | ................ F02B 1/12 |
| WO | 2015154183 A1 | | 10/2015 | |
| WO | 2018084834 A1 | | 5/2018 | |

OTHER PUBLICATIONS

European Search Report dated Mar. 24, 2023 in corresponding European Patent Application No. 22205116.1, 15 pages.

* cited by examiner

SYSTEM, A METHOD OF CONTROLLING A SYSTEM, AND A VEHICLE COMPRISING A SYSTEM

TECHNICAL FIELD

The present disclosure relates to combustion of low cetane fuels in an internal combustion engine. In particular, the present disclosure relates to an internal combustion engine, ICE system for a vehicle. Moreover, the present disclosure relates to a method for controlling such ICE system of a vehicle. Further, the present disclosure relates to a vehicle comprising such ICE system. The present disclosure may typically be applied in an ICE system used as a part of a driveline of heavy-duty vehicles, such as trucks, buses, and construction equipment. The present disclosure may likewise be applied in other vehicles such as cars and other light-weight vehicles etc., but also in marine vessels and the like. Other applications are also possible, such as the application of the present disclosure in a stationary power plant system.

BACKGROUND

The propulsion systems of vehicles are continuously developed to meet the demands from the market. A particular technical area of vehicle propulsions systems relates to the emission of environmentally harmful exhaust gases. Therefore, other more environmentally friendly alternatives compared to conventional diesel internal combustion engines are evaluated and implemented in vehicles. One example of such alternatives is a hydrogen gaseous internal combustion engine. Another example of such alternatives is a methanol internal combustion engine.

Moreover, internal combustion engines are continuously developed to meet a number of other demands at least partly related to the environment and emissions. By way of example, increasing engine efficiency and lower noise level from the ICE systems are some of the criteria that have become more important aspects when designing and selecting internal combustion engine (ICE) system for heavy-duty vehicles.

Furthermore, in the field of heavy-duty vehicles, such as trucks, there are a number of prevailing environmental regulations that set specific requirements on the vehicles, e.g. restrictions relating to maximum allowable amount of exhaust gas pollution.

One type of ICE system that has the potential to meet prevailing and future environmental regulations is a hydrogen ICE system in which the combustion of hydrogen with oxygen produces water, heat and NOx as by-products. Hydrogen is one type of low cetane fuels. The hydrogen can either be provided as hydrogen gas or as hydrogen fluid. Another type of ICE system that has the potential to meet prevailing and future environmental regulations is a methanol ICE system.

In the field of fuel systems and fuel injections systems for ICE systems, there is further an increasing demand for improving the efficiency in supplying fuel to the ICE. Therefore, the ICE system generally comprises a fuel injection system in the form of a so-called common rail system, in particular for ICE systems where the fuel is directly injected to the cylinders of the ICE. These types of fuel injection systems may commonly be denoted as direct fuel injection systems. A typical common rail system is fluidly connected to a high-pressure fuel pump delivering fuel via a high-pressure line to the common rail. The common rail is a form of an accumulator. The term common rail system is indicative of a fuel injection system in which there is a common rail which supplies multiple injectors with fuel. The common rail is configured to deliver fuel via a plurality of high-pressure pipes to multiple injectors. The system may for example comprise six injectors, six high pressure pipes, and one common rail (for a 6-cylinder engine).

In some ICE system, the fuel is injected into the cylinders of the ICE and then ignited by a spark plug device. Other solutions of igniting the fuel are also conceivable depending on the type of fuel and type of ICE.

In order to meet at least some of the above-mentioned demands, various engine concepts have been developed throughout the years where conventional combustion cylinders and fuel systems have been combined in several different manners to provide an efficient and reliable ICE system.

However, there is still a need for an improved ICE system operable on low-cetane fuels.

SUMMARY

It is an object of the present disclosure to provide an improved thermodynamic efficiency over a wide operating range of an internal combustion engine system of a vehicle, in which the internal combustion engine is operable on a low cetane fuel. The object is at least partly achieved by an assembly according to claim 1. The object is also achieved by the other independent claims. The dependent claims are directed to advantageous embodiments of the disclosure.

According to a first aspect of the disclosure, there is provided an internal combustion engine system for a vehicle. The internal combustion engine system comprises an internal combustion engine, ICE, operable on a low cetane fuel and having a cylinder at least partly defining a combustion chamber and an ignition source for the low cetane fuel; a fuel injector for injecting the low cetane fuel into the combustion chamber; an ignition improver device in fluid communication with the fuel injector and further configured to supply an ignition improver fluid to the low cetane fuel. The internal combustion engine system further comprises a control unit configured to selectively operate the ICE in a spark ignition, SI, mode and a compression ignition, CI, mode. In addition, the control unit is configured to determine an ICE operating condition and control the ignition improver device to supply a given amount of ignition improver fluid to the low cetane fuel on the basis of said determined ICE operating condition.

The present disclosure is based on the insight that many low cetane fuels can offer both substantial reduction of $CO_2$ emissions and reduced operating costs. However, many low cetane fuels are also subject to poor auto-ignition. Therefore, there is an advantage to supply an ignition improver fluid to the low cetane fuel so as to at least partly overcome the problem of having a poor auto-ignition of the low cetane fuel in the combustion cylinder of the ICE system.

By the provision of providing a control unit configured to determine an ICE operating condition and control the ignition improver device to supply a given amount of ignition improver fluid to the low cetane fuel on the basis of the determined ICE operating condition, it becomes possible to provide a more efficient and controllable supply of ignition improver fluid, whilst improving the ignitability of the low cetane fuel in a cost-efficient manner. This may be particularly beneficial for certain combinations of ignition improver fluid and low cetane fuels. In addition, such control of the ignition improver device is different to available systems for supplying ignition improver fluid, where the amount of ignition improver is generally chosen to be able to handle all engine load cases of the ICE. As lower engine loads and cold starts may generally demand a higher amount of ignition improver, such prior art ignition improver devices are usually associated with high supply costs.

In addition, by the provision of providing a control unit configured to selectively operate the ICE in a spark ignition, SI, mode and a compression ignition, CI, mode, it becomes possible to operate the ICE system in a number of different ICE modes, thereby providing an efficient yet reliable ICE system during different driving operations of the vehicle. By way of example, CI combustion mode with ignition improver is advantageous at high load to enable high efficiency and adequate power density, while SI combustion mode without ignition improver may be used at lower load to enable relatively low emissions.

Accordingly, the proposed system provides for improved thermodynamic efficiency over a wide operating range of the ICE system.

The control unit may be configured to control the ignition improver device to supply the given amount of ignition improver fluid to the low cetane fuel in response to receiving a control signal indicating a switch from the SI mode to the CI mode, such that said ignition improver fluid is supplied to the low cetane fuel during said switching from the SI mode to the CI mode. In this manner, the ignition improver fluid is supplied to the low cetane fuel just before a switching from the SI mode to the CI mode, thereby facilitating the auto-ignition of the low cetane fuel when commencing the CI mode of the ICE system.

While it may be beneficial to supply the ignition improver fluid to the fuel as late as possible for reasons of controllability, the ignition improver fluid can be supplied in several different manners, as described in the following.

The ignition improver fluid may be supplied to the low cetane fuel at a position in a fluid conduit arranged upstream the fuel injector. In this manner, it becomes possible to provide a controlled supply of the ignition improver fluid to the low cetane fuel for certain types of ICE systems.

The fuel injector may be adapted to receive the low cetane fuel and the ignition improver fluid via separate first and second inlets, such that the low cetane fuel and the ignition improver fluid are blended at the fuel injector. In this manner, it becomes possible to provide a controlled supply of the ignition improver fluid to the low cetane fuel for certain types of ICE systems.

Alternatively, the fuel injector may be adapted to supply a blended amount of low cetane fuel and ignition improver fluid via a common outlet to the combustion chamber. Such configuration of the fuel injector may be beneficial for improving the supply of the ignition improver fluid to the low cetane fuel for other types of ICE systems. In addition, this configuration may have a positive impact on the controllability of the ICE system.

The supply and control of the ignition improver fluid can be performed in several different ways. Optionally, the control unit and the ignition improver device are configured to control the supply of ignition improver fluid according one or more of the following examples.

By way of example, the control unit may be configured to determine the given amount of ignition improver fluid on the basis of a magnitude of the determined ICE operating condition. The control unit may be configured to increase the amount of ignition improver fluid if the determined ICE operating condition corresponds to a non-favourable auto-ignition ICE condition. In addition, or alternatively, the control unit may be configured to reduce the amount of ignition improver fluid if the determined ICE operating condition corresponds to a favourable auto-ignition ICE condition.

A favourable auto-ignition ICE condition is an ICE operating condition that is favourable for auto-ignition of the low-cetane fuel when it is supplied into the combustion chamber of an engine cylinder. A non-favourable auto-ignition ICE condition is an ICE operating condition that is non-favourable for auto-ignition of the low-cetane fuel when it is supplied into the combustion chamber of the engine cylinder.

The ICE operating condition may be indicative of any one of an ICE load, an ICE revolution value, a cylinder pressure level and a temperature level. Such parameters and values may be stored in a memory of the control unit and/or received at the control unit from the ICE system during operation of the ICE.

The control unit may generally be configured to compare the determined operating ICE condition with a reference value to determine if the determined operating ICE condition is a non-favourable auto-ignition ICE condition or a favourable auto-ignition ICE condition.

Such reference values are generally determined by practical experimentation, analytical derivation, computer simulation, or a combination of the above. In practice, the reference values may be represented by a look-up table (LUT) indexed by the reference values. By way of example, the look-up table contains data of various revolution values, cylinder pressure levels and the temperature levels. The reference values of these revolution values, cylinder pressure levels and the temperature levels may be used to determine if the determined ICE condition is a non-favourable auto-ignition ICE condition or a favourable auto-ignition ICE condition.

By way of example, the spark ignition, SI, mode corresponds to an otto-cycle mode.

By way of example, the low cetane fuel is any one of hydrogen, methanol, ammonia, E85, pure ethanol and naphtha. The hydrogen fuel may either be hydrogen gas or hydrogen fluid.

The ignition improver fluid may comprise a liquid or gas containing a substance affecting the auto-ignition temperature of the low cetane fuel. Hence, the ignition improver fluid generally affects the combustion characteristics of the low cetane fuel.

In some examples, the substance of the ignition improver fluid contains any one of nitrates, nitroalkanes, nitro-carbonates and peroxides. Such type of improver fluids may be considered more efficient than using e.g. a separate fuel for improving the ignition of another fuel in a dual fuel ICE system.

The ignition improver fluid may comprise a combination of substances.

By way of example, the substance of the ignition improver fluid contains nitrates, nitroalkanes, nitro-carbonates and peroxides.

In some examples, the internal combustion engine, ICE, system may be a single fuel ICE system. In some examples, the internal combustion engine may thus be operable on a single fuel. A single fuel ICE system is different to a dual fuel ICE system. The single fuel may be a low cetane fuel. In such examples, the ignition improver fluid may favourably comprise a liquid or gas containing a substance affecting the auto-ignition temperature of the low cetane fuel, wherein the substance of the ignition improver fluid contains any one of nitrates, nitroalkanes, nitro-carbonates and peroxides. By using such ignition improver fluid in a single low cetane fuel ICE system operating in the CI combustion mode it becomes possible to provide an even more efficient operation of the ICE system. In addition, the use of such type of ignition improver fluid in a single low cetane fuel ICE system provides for a more efficient ICE system compared to a dual fuel ICE system, using one of the fuels as an ignition improver compound, because such dual fuel ICE system may generally be associated with higher fuel supply cost. As such, the single low cetane fuel ICE system using an ignition improver fluid with a substance containing any one of nitrates, nitroalkanes, nitro-carbonates and peroxides, provides for an even more efficient and controllable use of the ignition improver fluid during CI combustion mode, and/or at the above switch from the SI mode to the CI mode.

The ignition source for operating the ICE in the SI mode may be any one of a spark plug, glow plug and pilot fuel injection.

The control unit may be configured to increase the amount of ignition improver fluid if the determined ICE operating condition corresponds to a low load ICE condition. The control unit may be configured to reduce the amount of ignition improver fluid if the determined ICE operating condition corresponds to a high load ICE condition.

According to a second aspect there is provided a method for controlling an internal combustion engine system of a vehicle. The internal combustion engine system comprises an internal combustion engine, ICE, operable on a low cetane fuel and having a cylinder at least partly defining a combustion chamber and an ignition source for the low cetane fuel; a fuel injector for injecting the low cetane fuel to the combustion chamber; an ignition improver device in fluid communication with the fuel injector for supplying an ignition improver fluid to the low cetane fuel. The method comprises: operating the ICE in a spark ignition, SI, mode; determining an ICE operating condition; and supplying a given amount of ignition improver fluid to the low cetane fuel on the basis of said determined ICE operating condition.

Effects and features of this second aspect of the present disclosure are largely analogous to those described above in connection with the first aspect of the disclosure. Embodiments mentioned in relation to the first aspect of the present disclosure are largely compatible with the second aspect of the disclosure.

The method according to the example embodiments can be executed in several different manners. According to one example embodiment, the steps of the method are performed by a control unit during use of the ICE system of the vehicle. According to one example embodiment, the steps of the method are performed in sequence. However, at least some of the steps of the method can be performed in parallel.

The method may further comprise switching from the SI mode to a compression ignition, CI, mode.

The switching from the SI mode to the CI mode may be performed during a transition period where the ICE system may operate in various temporarily and intermediate ICE modes, such as a spark-assisted CI mode etc.

The method may further comprise increasing the amount of ignition improver fluid if the determined ICE operating condition corresponds to a non-favourable auto-ignition ICE condition.

The method may further comprise reducing the amount of ignition improver fluid if the determined ICE operating condition corresponds to a favourable auto-ignition ICE condition.

The method may further comprise controlling the fuel injector to supply the blended low cetane fuel and ignition improver fluid to the combustion chamber of the cylinder.

The method may further comprise operating different cylinders in different modes on the basis of the determined ICE operating condition.

According to a third aspect, there is provided a computer program comprising program code means for performing the steps of any one of the embodiments described above in relation to the second aspect when the program is run on a computer or on processing circuitry of a control system. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storages of magnetic, optical or solid-state type. Still within the scope of "data carrier", such memories may be fixedly mounted or portable.

According to a fourth aspect, there is provided a computer readable medium carrying a computer program comprising program means for performing the steps of any one of the embodiments described above in relation to the second aspect when the program means is run on a computer or on processing circuitry of a control system.

Effects and features of the third and fourth aspects are largely analogous to those described above in relation to the first and second aspects.

According to a fifth aspect, there is provided a vehicle comprising an internal combustion engine system according to the first aspect of the present disclosure. Effects and features of this fifth aspect of the present disclosure are largely analogous to those described above in connection with the first disclosure. Embodiments mentioned in relation to the first aspect of the present disclosure are largely compatible with the fifth aspect of the disclosure.

Further advantages and advantageous features of the disclosure are disclosed in the following description and in the dependent claims. It should also be readily appreciated that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION OF EXAMPLE EMBODIMENTS OF THE DISCLOSURE

Figure 1:
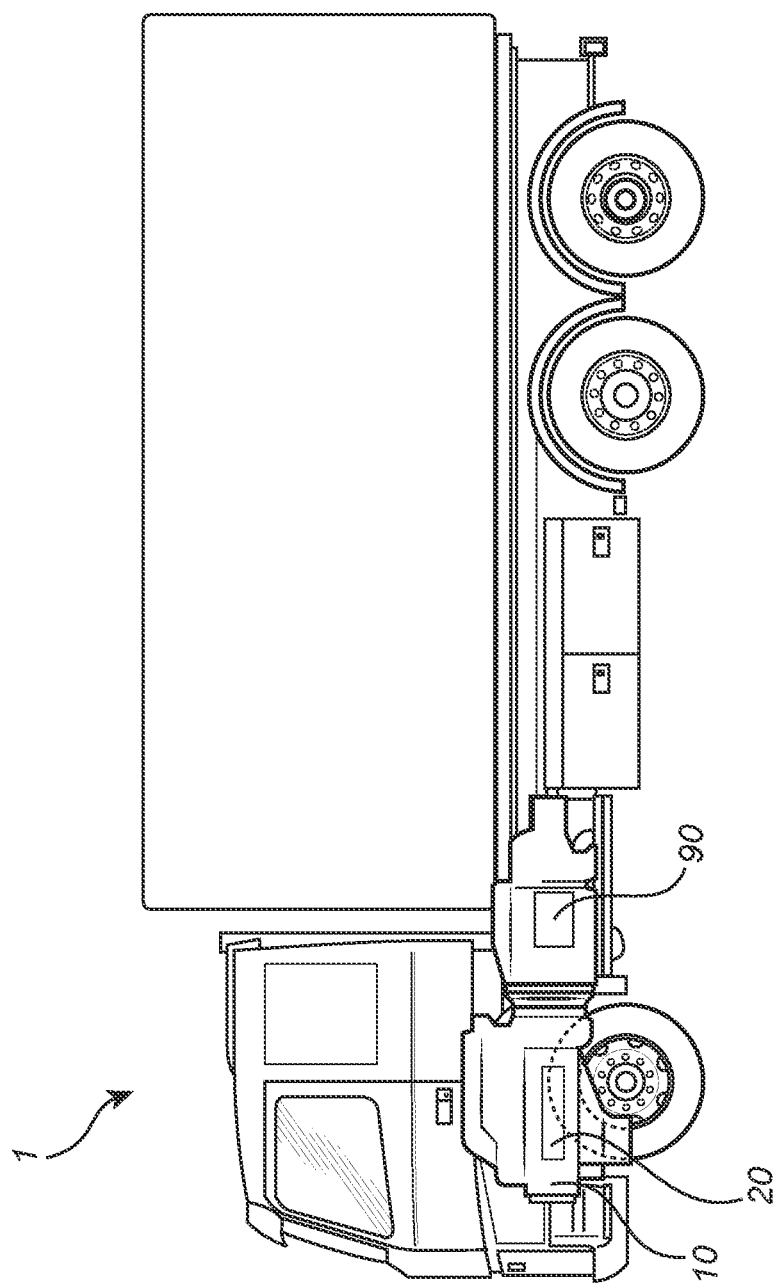
FIG. 1 is a side view of a vehicle comprising an internal combustion engine, ICE, system according to an example embodiment of the present disclosure.

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 1 in the form of a truck. The vehicle 1 comprises an internal combustion engine, ICE, system 10 for powering and driving the vehicle 1. The ICE system 10 in FIG. 1 also comprises an ICE 20. In this example, the ICE system 10 is a hydrogen piston ICE system. The combustion in such hydrogen ICE system is based on a combustion of air and hydrogen, as is commonly known in the art. While the combustion of hydrogen with oxygen may only produce water as its only product in a pure combustion process between hydrogen and oxygen, a hydrogen ICE system based on combustion of air and hydrogen generally produce water, heat and NOx, as is commonly known in the art. In addition, hydrogen can be combusted in an internal combustion engine over a wide range of fuel-air mixtures. A hydrogen ICE system may be operated to produce very low emissions during certain conditions. The hydrogen ICE system may operate based on hydrogen liquid or hydrogen gas.

Figure 2:
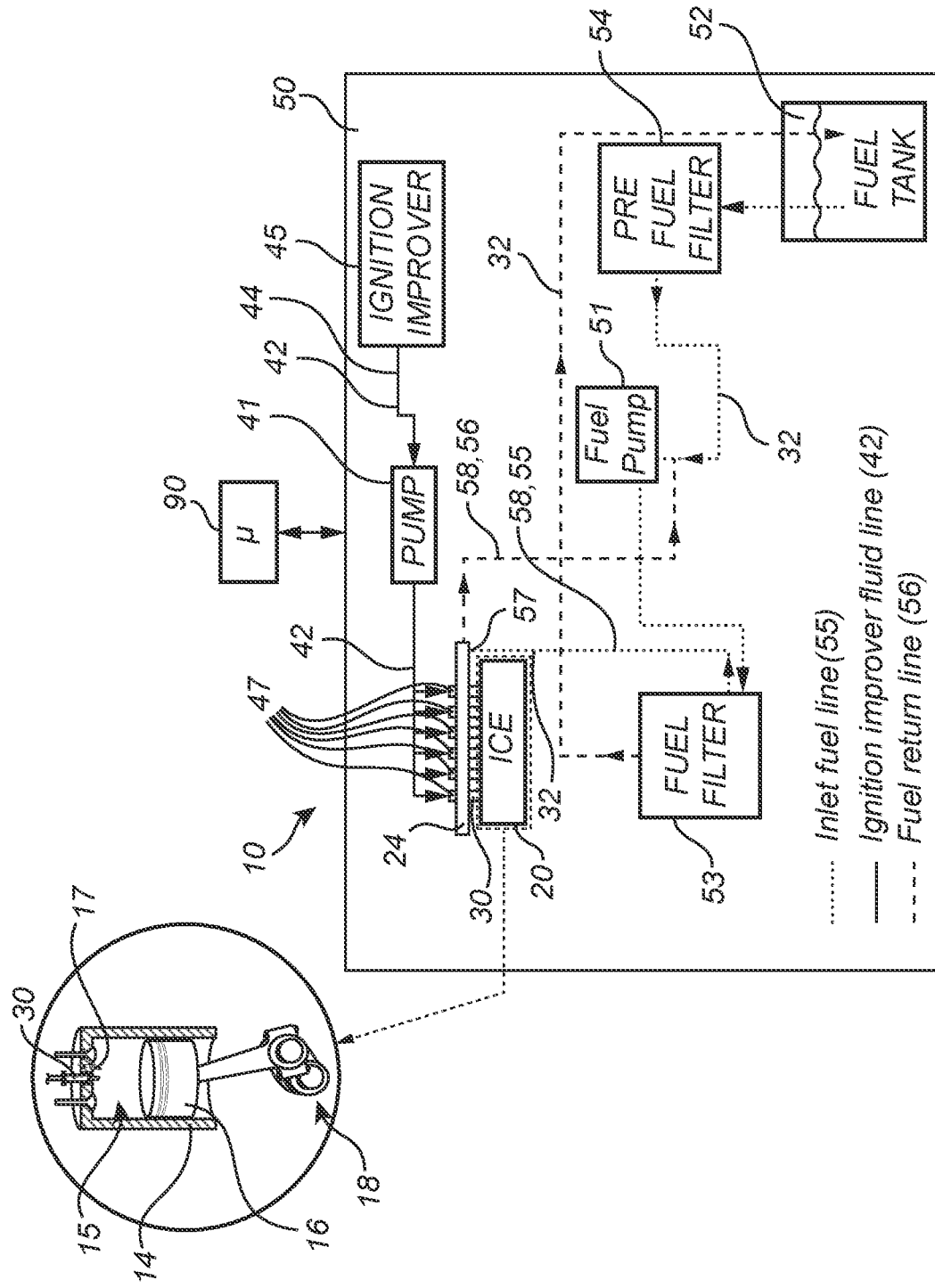
FIG. 2 is a schematic view of further components of the ICE system according to an example embodiment of the present disclosure, in which the ICE system can be incorporated into vehicle illustrated in FIG. 1.
Figure 3:
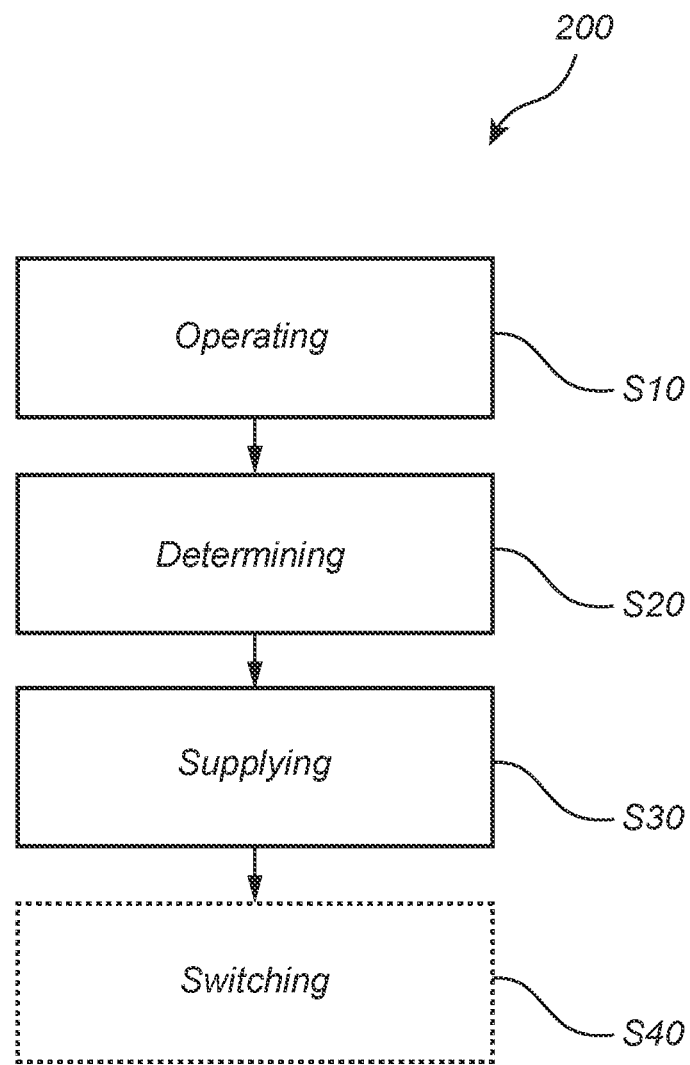
FIG. 3 is a flow-chart for performing a method of controlling the ICE system according to an example embodiment of the present disclosure.

For ease of reference, the ICE system 10 described in relation to the FIGS. 1 to 3 is a hydrogen gas ICE system, i.e. the low-cetane fuel is hydrogen gas. However, the ICE system may as an alternative comprise another type of ICE operable on another type of low-cetane fuel. Another conceivable type of low-cetane fuel is methanol. Hence, the below example is likewise applicable to a methanol ICE system.

In addition, the ICE system 10 described in relation to the FIGS. 1 to 3 is a single fuel ICE system. Thus, the ICE system 10 is a single low-cetane fuel ICE system. The ICE 20 is thus operable on a single fuel in the form of a low-cetane fuel.

As depicted in FIG. 1, the ICE system 10 further comprises a control unit 90. The control unit 90 is arranged in communication with the components of the ICE system 10. As will be further described in relation to FIG. 3, the control unit 90 is configured to perform any one of a number of steps of a method for controlling the ICE system 10. The control unit 90 is here a part of a main electronic control unit for controlling the vehicle and various parts of the vehicle.

Turning now to FIG. 2, there is depicted one example embodiment of the ICE system 10 for incorporation in a vehicle as described above in relation to FIG. 1. As is generally commonly known in the art of ICE systems 10, the ICE 20 comprises a plurality of cylinders 14 operated to combust fuel 32, such as hydrogen gas, whereby the motion of pistons 16 reciprocating in the cylinders 14 is transmitted to a rotation movement of a crank shaft 18. The crank shaft 18 is further coupled to a transmission (not shown) for providing a torque to driving elements (not shown). In case of a heavy-duty vehicle, such as a truck, the driving elements are wheels; however, the ICE 20 may also be used for other equipment such as construction equipment, marine applications, etc.

Generally, each cylinder 14 is provided with a corresponding piston 16 connected to the crankshaft 18 of the ICE 20. The ICE system 10 further comprises an intake manifold (not shown) forming intake guides arranged to guide air to the cylinders 14, and an exhaust guide (not shown) arranged to guide gases from the cylinders 14.

The ICE system 10 further comprises an exhaust gas arrangement (not shown), which serves the purpose of conveying exhaust gases and recovering at least some of the energy in the exhaust gas flow to improve the performance of the ICE.

Each cylinder 14 may further comprise at its vertical top end at least one and typically a multiple number of inlet channels for inlet air, and at least one and typically a multiple number of exhaust channels for exhaust gases from the fuel combustion process taking place within the cylinder 14. The cylinder is only described in general terms since its parts and functionality is well known in the art. The cylinder configuration may be e.g. straight, V-shaped or any other suitable kind. The ICE system 10 may also include additional engine components and system components.

Each one of the cylinders 14 defines at least partly a combustion chamber 15. As is also common, one end of the cylinder cavity is closed by a cylinder head. The piston 16 reciprocates in the cylinder and is connected to the crankshaft 18 so that the piston is set to reverse in the cylinder at an upper and lower dead centre position.

The ICE system 10 here further comprises a common rail fuel injection system 24, as is commonly known in the art. As illustrated in FIG. 2, the common rail fuel injection system 24 defines a common fuel line 25 ("common rail") and is configured to supply hydrogen gas to the cylinders 16 by means of a number of injectors 30. Thus, the common rail fuel injection system 24 here includes the plurality of injectors 30. The number of injectors 30 may be equal to the numbers of cylinders of the ICE 20. Here, the common rail fuel injection system 24 comprises six injectors 30, as illustrated in FIG. 2. The fuel injectors 30 are arranged in fluid communication with the common fuel line 25 of the common rail fuel injection system 24. The common rail fuel injection system 24 is generally arranged inside the ICE 20. Thus, in order to inject fuel into the combustion chamber of the cylinder, the ICE typically comprises one or more fuel injectors 30.

In addition, the ICE 20 comprises an ignition source 17. The ignition source 17 is arranged in the cylinder and at a location facing the combustion chamber. By way of example, the ignition source 17 is arranged at an upper end of the combustion cylinder and spaced apart from the fuel injector, as illustrated in FIG. 2. Other arrangements of the ignition source and the fuel injector are also conceivable.

The ignition source 17 is configured to ignite the hydrogen gas 32 supplied via the common fuel line 25. By way of example, the ignition source is a spark-plug 17. A spark plug is a device for delivering electric current from an ignition system to the combustion chamber of a spark-ignition engine to ignite the compressed fuel/air mixture by an electric spark, while containing combustion pressure within the engine. Typically, in each cylinder 14, there is a corresponding spark plug arranged to ignite a mix of fuel and oxygen in the cylinder. The hydrogen fuel is generally compressed to a certain level. The compressed air-fuel mixture is thus ignited by the spark plug.

In a hydrogen ICE 20, the fuel in the form of gaseous hydrogen is supplied to the ICE 20 from a fuel tank via a fuel system. Hence, the ICE system 10 further comprises a fuel system 50, a fuel pump 51 and a fuel conduit circuit 58, as illustrated in FIG. 2. The fuel conduit circuit 58 is arranged and configured to contain and transport the fuel, as illustrated by the arrows in FIG. 2.

The fuel pump 51 is arranged and configured to pressurize the fuel to a high-pressure level. The fuel pump 51 is arranged in the fuel system 50 to transfer the high-pressure fuel to the fuel injectors 30 arranged inside the ICE 20, as illustrated in FIG. 2. The fuel pump 51 is of a conventional type and thus not further described herein. In addition, the fuel pump 51 is in fluid communication with the fuel tank 52 for receiving fuel. As depicted in FIG. 2, the fuel pump 51 may be in fluid communication with both an inlet fuel line 55 and a fuel return line 56. Other designs and systems are also conceivable and commonly used for supplying fuel to the ICE 20.

As illustrated in FIG. 2, the fuel pump 51 is in fluid communication with the common rail fuel injection system 24 by means of the fuel conduit circuit 58. The one or more fuel injectors 30 are adapted to receive the hydrogen gaseous fuel 32 via one or more inlets. In FIG. 2, the one or more fuel injectors 30 are adapted to receive the hydrogen gaseous fuel 32 via an inlet 57. By way of example, the fuel conduit circuit 58 comprises the inlet fuel line 55 and the fuel return line 56. The inlet fuel line 55 is connected to the inlet 57 of the common rail fuel injection system 24. Accordingly, the fuel pump 51 is in fluid communication with the common rail fuel injection system 24 via the inlet fuel line 55 and the fuel return line 56.

Optionally, the fuel system 50 further comprises a fuel filter 53 disposed in the fuel conduit circuit 58. The fuel filter 53 is configured to filter the fuel. Generally, a fuel filter is a filter in a fuel line that screens out dirt and other particles from the fuel, and is normally made into cartridges containing a filter paper. Further, the fuel system 50 here comprises a pre-fuel filter 52 disposed in the inlet fuel line 55 of the fuel conduit circuit 58, as illustrated in FIG. 2. Typically, the pre-fuel filter is arranged in the fuel system with purpose of separating water from the fuel and removing residues in the fuel, thereby preventing them from being pumped into the ICE and causing oxidation, corrosion and cavitation problems in the cylinders. The pre-filter is also useful for extending the life-time of the injectors.

Moreover, the ICE system 10 comprises an ignition improver device 40, as illustrated in FIG. 2. The ignition improver device 40 is arranged in fluid communication with the one or more fuel injectors 30. By way of example, the ignition improver device 40 is arranged in fluid communication with the one or more fuel injectors 30 via the common rail system 24. In addition, the ignition improver device is configured to supply an ignition improver fluid 44 to the hydrogen gaseous fuel, as illustrated in e.g. FIG. 2. The ignition improver device 40 here comprises an ignition improver fluid tank 45 for storing the ignition improver fluid 44. The ignition improver fluid contains a substance that affects the auto-ignition the fuel. By way of example, the ignition improver fluid 44 is a liquid or gas containing a substance for affecting the auto-ignition of the methanol fuel. In another example where the fuel is hydrogen gas, the ignition improver fluid 44 is a liquid or gas containing a substance for affecting the auto-ignition of the hydrogen gas fuel.

Hence, the ignition improver fluid generally affects the combustion characteristics of the low cetane fuel.

By way of example, the substance of the ignition improver fluid contains any one of nitrates, nitroalkanes, nitro-carbonates and peroxides. These substances are generally knows as having a positive impact on the auto-ignition of low-cetane fuels, such as methanol, hydrogen and the like.

As mentioned above, the ICE of the ICE system 10 is operable based on a single fuel in the form of a low cetane fuel. In such examples, there is particularly beneficial to use a dedicated ignition improver fluid with a substance containing any one of nitrates, nitroalkanes, nitro-carbonates and peroxides.

In order to supply the ignition improver fluid from the ignition improver fluid tank 45 to the hydrogen gaseous before combustion thereof, the ICE system 10 comprises an ignition improver fluid circuit 42 extending between the ignition improver fluid tank 45 and the ICE 20, as illustrated in FIG. 2. Optionally, there is also a fluid pump 41 disposed in the ignition improver fluid circuit 42 for directing the ignition improver fluid 44 to the one or more fuel injectors 30. In FIG. 2, the ignition improver device 40 comprises the fluid pump 41, the ignition improver fluid circuit 42, the ignition improver fluid 44 and the ignition improver fluid tank 45. Other types of ignition improver device 40 are also conceivable depending on type of ICE system. Further, while the ignition improver device 40 is here an integral part of the fuel cell system 50, the ignition improver device 40 may likewise be a separate part of the ICE system 10. The one or more fuel injectors 30 are adapted to receive the ignition improver fluid 44 via corresponding inlets 47.

Turning again to FIG. 2, the one or more fuel injectors 30 are adapted to receive the hydrogen gaseous fuel 32 via the inlet 57 and to receive the ignition improver fluid 44 via the inlet 47. Hence, the one or more fuel injectors 30 are adapted to receive the hydrogen gaseous fuel 32 and ignition improver fluid 44 via separate first and second inlets 57 and 47, respectively. As such, the hydrogen gaseous fuel 32 and the ignition improver fluid 44 are blended at the one or more fuel injectors 30.

In another example, although not illustrated, the ignition improver fluid 44 is supplied to the hydrogen gaseous fuel 32 at a position in the fluid conduit 58 arranged upstream the one or more fuel injectors 30. Alternatively, although not shown, the fuel injector 30 is adapted to supply a blended amount of hydrogen gaseous fuel 32 and ignition improver fluid 44 via a common outlet to the combustion chamber 45.

As mentioned above, the ICE system 10 comprises the control unit 90. The control unit is here configured to selectively operate the ICE in a spark ignition, SI, mode and a compression ignition, CI, mode. By way of example, the control unit 90 comprises a processing circuit configured to selectively operate the ICE in a spark ignition, SI, mode and a compression ignition, CI, mode. The processing circuit may contain a software and/or an algorithm containing instruction for the ICE 20 to operate in each one of the SI- and CI modes. By way of example, the spark ignition, SI, mode corresponds to an otto-cycle mode. The otto-cycle mode is e.g. a conventional four stroke mode. In such SI mode, a fuel-air mixture is introduced into the cylinder through the fuel injector (hydrogen gas fuel and ignition improver fluid) and the intake valve (compressed air) during an intake stroke. Subsequently, the fuel-air mixture is compressed in a compression stroke. Thereafter, the combustion stroke (or power stroke) is performed (constant volume) where produced gases expand. Finally, the ICE 20 performs an exhaust stroke, where produced gases are exhausted from the cylinder through the exhaust valve.

In the CI mode, the ICE 20 generally works according to the sequence of fuel being injected into a charge of compressed air and spontaneously ignited by the high temperature of the induced air by the heat of compression.

In order to facilitate the operation of the ICE system 20, the ignition improver device 40 is configured to be controlled by the control unit 90, as further described hereinafter. In particular, the ignition improver device 40 is controlled to supply the ignition improver fluid 44 to the hydrogen gaseous fluid 32 so as to facilitate the ignition of the fuel when the ICE system 20 is to be operated in the SI mode. Hence, the control unit 90 is configured to control the ignition improver device 40 to supply a given amount of ignition improver fluid 44 to the hydrogen gaseous fluid 32 in response to receiving a control signal indicating a switch from the SI mode to the CI mode. Thereby, the ignition improver fluid 44 is supplied to the hydrogen gaseous fluid 32 during the switching from the SI mode to the CI mode.

In order to minimize the consumption of the ignition improver fluid 44 and thus the costs of the used ignition improver fluid 44, the ignition improver fluid 44 is further dosed on the basis of a current engine operation condition. As mentioned above, the ignition improver fluid 44 is introduced to the fuel system close to the fuel injectors 30 or directly to the fuel injectors 30 via a separate inlet 47. At low load on the ICE 20, more ignition improver fluid may generally be needed while a higher load on the ICE 20 may require less ignition improver. Further, as mentioned above, the ignition improver fluid 44 can be added to the fuel system just before the injectors 30 in the case of a unit injector fuel system. In the case of a common rail system, as illustrated in FIG. 2, the ignition improver fluid 44 is generally added to the low-pressure side or to the high-pressure fuel rail. By adding the ignition improver fluid 44 close to the injectors 30, the supply of the ignition improver fluid 44 is generally facilitated in terms of controllability.

Moreover, the control unit 90 is here further configured to determine an ICE operating condition and control the ignition improver device 40 to supply a given amount of ignition improver fluid 44 to the hydrogen gaseous fluid 32 on the basis of the determined ICE operating condition. The control unit 90 is configured to determine the given amount of ignition improver fluid 44 on the basis of a magnitude of the determined ICE operating condition. By way of example, the control unit 90 is configured to increase the amount of ignition improver fluid 44 if the determined ICE operating condition corresponds to a condition not favourable for auto-ignition of the fuel, i.e. a non-favourable auto-ignition ICE condition. Purely by way of example, the non-favourable auto-ignition ICE condition is also a low load ICE condition.

In addition, or alternatively, the control unit 90 is configured to reduce the amount of ignition improver fluid 44 if the determined ICE operating condition corresponds to a condition favourable for auto-ignition of the fuel, i.e. a favourable auto-ignition ICE condition. Purely by way of example, the favourable auto-ignition ICE condition is also a high load ICE condition.

Since the auto-ignition of low-cetane fuels generally depends on the temperature, the ICE operating condition may also generally be directly or indirectly indicative of the temperature inside the combustion chamber. The temperature is one factor that directly has an impact on initiating the chemical reaction to ignite the fuel. However, since different engine loads and rpm generally gives different pressures that in turn gives different temperature, it may also be possible to determine other ICE operating condition such as the pressure, engine load etc. in order to decide if the ICE operating condition is a non-favourable auto-ignition ICE condition or favourable auto-ignition ICE condition.

The ICE operating condition is indicative of any one of an ICE load, an ICE revolution value, a cylinder pressure level and a temperature level. Such parameters and values may be stored in a memory of the control unit and/or received at the control unit from the ICE system during operation of the ICE. By way of example the temperature level of the ICE is measured by a temperature sensor arranged inside one or more cylinders of the ICE. In a similar vein, the pressure level inside the cylinder, i.e. in the combustion chamber of the cylinder, is measured by a pressure sensor arranged in the combustion chamber. The ICE load and the ICE revolution value can be measured and determined in several different ways, as is commonly known in the field of ICE system.

The parameters and values of the determined ICE operating condition may be compared with a reference value. Such reference values are generally determined by practical experimentation, analytical derivation, computer simulation, or a combination of the above. In practice, the reference values may be represented by a look-up table (LUT) indexed by the reference values. By way of example, the look-up table contains data of various revolution values, cylinder pressure levels and the temperature levels. The reference values of these revolution values, cylinder pressure levels and the temperature levels are used to determine if the determined ICE condition is a non-favourable auto-ignition ICE condition or favourable auto-ignition ICE condition.

Accordingly, the control unit is generally configured to compare the determine ICE condition with a reference value to determine if the ICE condition is a non-favourable auto-ignition ICE condition or a favourable auto-ignition ICE condition.

To sum up, the example embodiment in FIGS. 1 and 2 illustrates one example of an internal combustion engine system 10 for the vehicle 1, which comprises the internal combustion engine, ICE, 20 operable on the low cetane fuel 32 and having the cylinder at least partly defining the combustion chamber and further including the ignition source for the low cetane fuel; the fuel injector 30 for injecting the low cetane fuel into the combustion chamber; the ignition improver device 40 in fluid communication with the fuel injector and further configured to supply the ignition improver fluid to the low cetane fuel; the control unit 90 configured to selectively operate the ICE in the spark ignition, SI, mode and the compression ignition, CI, mode, and wherein the control unit 90 is further configured to determine an ICE operating condition and control the ignition improver device to supply a given amount of ignition improver fluid to the low cetane fuel on the basis of the determined ICE operating condition.

As mentioned above, the example embodiment described in relation to FIGS. 1 and 2 are also applicable for an ICE system where the low-cetane fuel is methanol in liquid phase. Further, the example embodiment described in relation to FIGS. 1 and 2 are also applicable for other types of improver ignition fluids, both liquid and gas fluids.

It should also be noted that the use of the above ignition improver fluid, with the substance containing any one of nitrates, nitroalkanes, nitro-carbonates and peroxides, in the above single low cetane fuel ICE system provides for an even more efficient and controllable use of ignition improver fluid during CI combustion mode, and/or at the above switch from SI mode to the CI mode.

In FIG. 3, there is depicted a method 200 for controlling the ICE system 20, as described above in relation to FIGS. 1 and 2. The method is generally performed by the control unit 90 during operation of the ICE system 20. The method comprises the step of operating S10 the ICE 20 in a spark ignition, SI, mode.

Further, the method comprises the step of determining S20 an ICE operating condition. Subsequently, the method comprises the step of supplying S30 a given amount of ignition improver fluid to the low cetane fuel on the basis of the determined ICE operating condition.

Optionally, the method further comprises switching S40 from the SI mode to a compression ignition, CI, mode.

The method may further comprise increasing the amount of ignition improver fluid 44 if the determined ICE operating condition corresponds to a non-favourable auto-ignition ICE condition.

The method may further comprise reducing the amount of ignition improver fluid 44 if the determined ICE operating condition corresponds to a favourable auto-ignition ICE condition.

The method may further comprise controlling the fuel injector to supply the blended low cetane fuel and ignition improver fluid to the combustion chamber of the cylinder.

The method may further comprise operating different cylinders in different modes on the basis of the determined ICE operating condition.

The steps of the method are generally performed by the control system 90, as described above in relation to FIGS. 1 and 2. Hence, it should be noted that the embodiments of the method may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the ICE system described above includes a control unit being an integral part thereof, it is also possible that the control unit may be a separate part of the vehicle, and/or arranged remote from the system and in communication with the system.

The control unit may include a microprocessor, microcontroller, programmable digital signal processor or another programmable device. Thus, the control unit typically comprises electronic circuits and connections as well as processing circuitry such that the control unit can communicate with different parts of the ICE system such as the ICE, the ignition improver device, the fuel injector and the ignition source or any other component of the vehicle, such as the clutch, the gear box and/or any other parts in need of being operated in order to provide the functions of the example embodiments. Typically, the control unit may also be configured to communicate with other parts of the vehicle such as the brakes, suspension, and electrical auxiliary devices, e.g. the air conditioning system, in order to operate the vehicle according to the driver's needs. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transistory memory for storing computer program code and data upon. Thus, the control unit may be embodied by many different constructions.

The control unit 90 may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Also, although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the present disclosure is not limited to the embodiments described above and illustrated in the drawings; rather, the skilled person will recognize that many changes and modifications may be made within the scope of the appended claims. By way of example, the low cetane fuel is any one of hydrogen gas, hydrogen liquid, methanol and ammonia. In addition, the ignition source for operating the ICE in the SI mode is any one of a spark plug, glow plug and pilot fuel injection.

The invention claimed is:

1. A single-fuel internal combustion engine system for a vehicle, comprising: an internal combustion engine, ICE, operable on a low cetane fuel, the low cetane fuel being any one of hydrogen, methanol, ammonia, E85, pure ethanol and naphtha, said internal combustion engine having a cylinder at least partly defining a combustion chamber and an ignition source for the low cetane fuel; a fuel injector for injecting the low cetane fuel into the combustion chamber; an ignition improver device in fluid communication with the fuel injector and further configured to supply an ignition improver fluid to the low cetane fuel; a control unit configured to selectively operate the ICE in a spark ignition, SI, mode and a compression ignition, CI, mode, wherein the control unit is further configured to determine an ICE operating condition and control the ignition improver device to supply a given amount of ignition improver fluid to the low cetane fuel on the basis of said determined ICE operating condition.

2. The system according to claim 1, wherein the control unit is configured to control the ignition improver device to supply the given amount of ignition improver fluid to the low cetane fuel in response to receiving a control signal indicating a switch from the SI mode to the CI mode, such that said ignition improver fluid is supplied to the low cetane fuel during said switching from the SI mode to the CI mode.

3. The system according to claim 1, wherein the ignition improver fluid is supplied to the low cetane fuel at a position in a fluid conduit arranged upstream the fuel injector.

4. The system according to claim 1, wherein the fuel injector is adapted to receive the low cetane fuel and the ignition improver fluid via separate first and second inlets, such that the low cetane fuel and the ignition improver fluid are blended at the fuel injector.

5. The system according to claim 1, wherein the fuel injector is adapted to supply a blended amount of low cetane fuel and ignition improver fluid via a common outlet to the combustion chamber.

6. The system according to claim 1, wherein the control unit is configured to determine the given amount of ignition improver fluid on the basis of a magnitude of the determined ICE operating condition.

7. The system according to claim 1, wherein the control unit is configured to increase the amount of ignition improver fluid if the determined ICE operating condition corresponds to a non-favourable auto-ignition ICE condition and/or wherein the control unit is configured to reduce the amount of ignition improver fluid if the determined ICE operating condition corresponds to a favourable auto-ignition ICE condition.

8. The system according to claim 1, wherein the ICE operating condition is indicative of any one of an ICE load, an ICE revolution value, a cylinder pressure level and a temperature level.

9. The system according to claim 1, wherein the ignition improver fluid comprises a liquid or gas containing a substance for affecting an auto-ignition temperature of the low cetane fuel.

10. The system according to claim 9, wherein the substance of the ignition improver fluid contains any one of nitrates, nitroalkanes, nitro-carbonates and peroxides.

11. The system according to claim 1, wherein the ignition source for operating the ICE in the SI mode is any one of a spark plug, glow plug and pilot fuel injection.

12. A vehicle comprising an internal combustion engine system according to claim 1.

13. A method for controlling single-fuel internal combustion engine system of a vehicle, said system comprising an internal combustion engine, ICE, operable on a low cetane fuel, the low cetane fuel being any one of hydrogen, methanol, ammonia, E85, pure ethanol and naphtha, and having a cylinder at least partly defining a combustion chamber and an ignition source for the low cetane fuel; a fuel injector for injecting the low cetane fuel to the combustion chamber; an ignition improver device in fluid communication with the fuel injector for supplying an ignition improver fluid to the low cetane fuel, said method comprising:

operating the ICE in a spark ignition, SI, mode; determining an ICE operating condition; and supplying a given amount of ignition improver fluid to the low cetane fuel on the basis of said determined ICE operating condition.

14. The method according to claim 13, further comprising switching from the SI mode to a compression ignition, CI, mode.

15. The method according to claim 13, further comprising increasing the amount of ignition improver fluid if the determined ICE operating condition corresponds to a non-favourable auto-ignition ICE condition and/or further comprising reducing the amount of ignition improver fluid if the determined ICE operating condition corresponds to a favourable auto-ignition ICE condition.

16. The method according to claim 13, further comprising controlling the fuel injector to supply blended low cetane fuel and ignition improver fluid to the combustion chamber of the cylinder.

17. The method according to claim 13, further comprising operating different cylinders in different modes on the basis of the determined ICE operating condition.

* * * * *